United States Patent
Cardona

(10) Patent No.: US 8,336,570 B2
(45) Date of Patent: Dec. 25, 2012

(54) HIGH-PRESSURE FLUID CONDUIT

(75) Inventor: Robert Cardona, Cinnaminson, NJ (US)

(73) Assignee: Zena Associates, LLC, Folcroft, PA (US)

( * ) Notice: Subject to any disclaimer, the term of this patent is extended or adjusted under 35 U.S.C. 154(b) by 62 days.

(21) Appl. No.: 13/047,842

(22) Filed: Mar. 15, 2011

(65) Prior Publication Data

US 2012/0234423 A1  Sep. 20, 2012

(51) Int. Cl.
  *F16K 17/36* (2006.01)
(52) U.S. Cl. ............... 137/68.14; 137/614.04; 137/312; 138/104; 138/109; 138/110
(58) Field of Classification Search ............... 138/110, 138/109, 104, 114; 137/68.14, 614.04, 312; 251/128
  See application file for complete search history.

(56) References Cited

U.S. PATENT DOCUMENTS

| | | | |
|---|---|---|---|
| 1,304,364 A | 5/1919 | Phillips | |
| 2,054,561 A | 9/1936 | Greenberg | |
| 2,165,640 A | 7/1939 | Marx | |
| 3,273,578 A | 9/1966 | Clark | |
| 3,630,214 A | 12/1971 | Levering | |
| 3,802,456 A | 4/1974 | Wittgenstein | |
| 3,859,692 A | 1/1975 | Waterman | |
| 3,907,336 A | 9/1975 | Siegmund | |
| 3,913,603 A | 10/1975 | Torres | |
| 4,023,584 A | 5/1977 | Rogers et al. | |
| 4,098,438 A | 7/1978 | Taylor | |
| 4,351,351 A | 9/1982 | Flory et al. | |
| 4,509,558 A | 4/1985 | Slater | |
| 4,735,083 A | 4/1988 | Tenenbaum | |
| 4,827,977 A | 5/1989 | Fink, Jr. | |
| 4,886,087 A | 12/1989 | Kitchen | |
| 5,054,523 A | 10/1991 | Rink | |
| 5,099,870 A | 3/1992 | Moore et al. | |
| 5,172,730 A | 12/1992 | Driver | |
| 5,250,041 A * | 10/1993 | Folden et al. | ............ 604/284 |
| 5,343,738 A | 9/1994 | Skaggs | |
| 5,357,998 A | 10/1994 | Abrams | |
| 5,427,155 A | 6/1995 | Williams | |
| 5,497,809 A | 3/1996 | Wolf | |
| 5,518,034 A | 5/1996 | Ragout et al. | |

(Continued)

OTHER PUBLICATIONS

Website for HPF, Inc., Breakaway Couplings, www.hpflap.com, HPF, Inc., 13450 Indian Creek, Cleveland, Ohio 44130, Tel: 440-816-2195, 1-800-445-1289, Fax: 440-816-2196, 2 pages, Copyright 2006.

(Continued)

*Primary Examiner* — James Hook
(74) *Attorney, Agent, or Firm* — Barley Snyder

(57) ABSTRACT

A high-pressure fluid conduit that conducts high-pressure fluid from a high-pressure fluid source to a high-pressure fluid container. This high-pressure fluid conduit has a safety feature that is activated when the high-pressure fluid conduit fails due to exposure to a predetermined force. The safety feature is activated by the fracture of an annular ring that is positioned at either end of the high-pressure fluid conduit and is calibrated to fracture when exposed to the predetermined force. Fracture of the annular ring closes valves at each end of the high-pressure fluid conduit, thereby stopping the flow of high-pressure fluid from the high-pressure fluid source as well as the escape of high-pressure fluid from the high-pressure fluid container.

30 Claims, 4 Drawing Sheets

U.S. PATENT DOCUMENTS

| | | |
|---|---|---|
| 5,531,357 A | 7/1996 | Guilmette |
| 5,551,484 A | 9/1996 | Charboneau |
| 5,654,499 A | 8/1997 | Manuli |
| 5,714,681 A | 2/1998 | Furness et al. |
| 5,765,587 A * | 6/1998 | Osborne .................... 137/68.14 |
| 5,803,127 A | 9/1998 | Rains |
| 5,868,170 A | 2/1999 | Spengler |
| 5,931,184 A | 8/1999 | Armenia et al. |
| 6,260,569 B1 | 7/2001 | Abrams |
| 6,546,947 B2 | 4/2003 | Abrams |
| 2010/0276008 A1 | 11/2010 | Abrams |

OTHER PUBLICATIONS

Advertisement, Smalley Wave Springs, www.tfc.eu.com, 4 pages, Copyright 2008-2011.

Website, CSE IPG, Safety Breakaway Coupling, www.cse-ipg.com, 2 pages, Copyright 2000-2010.

\* cited by examiner

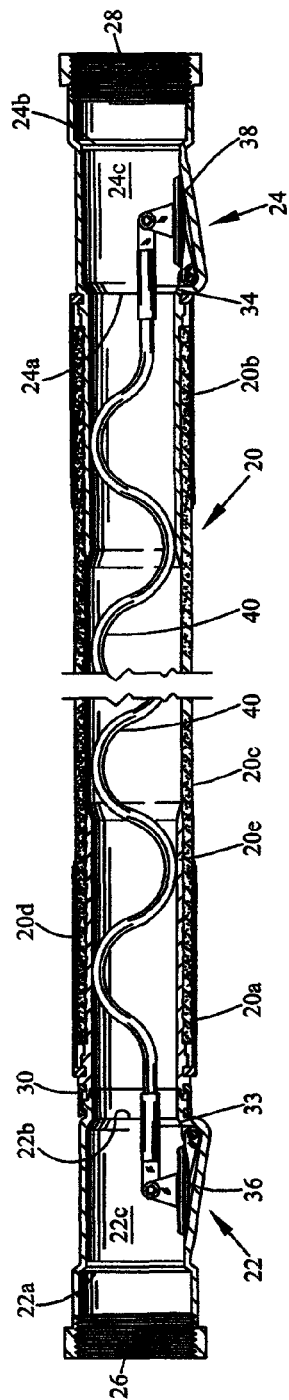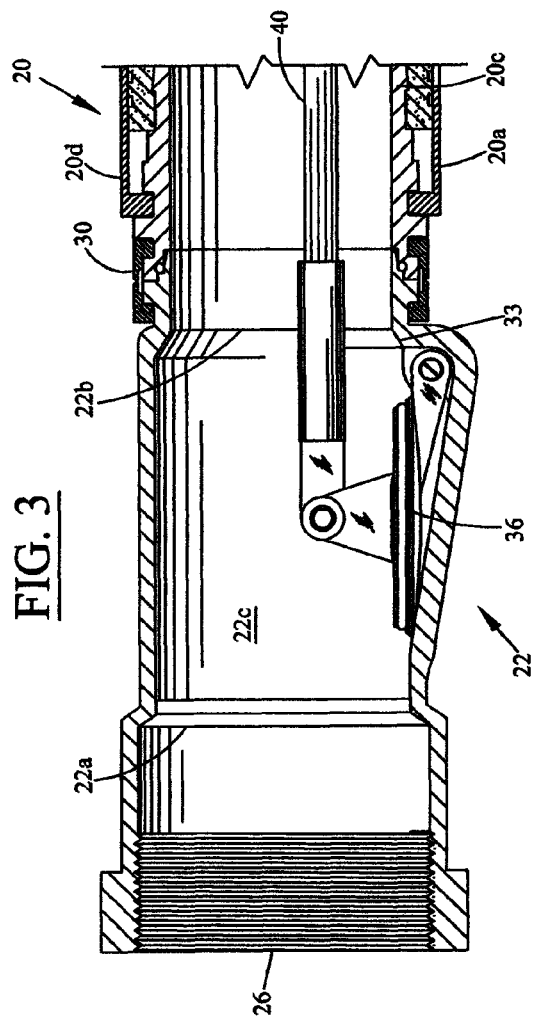

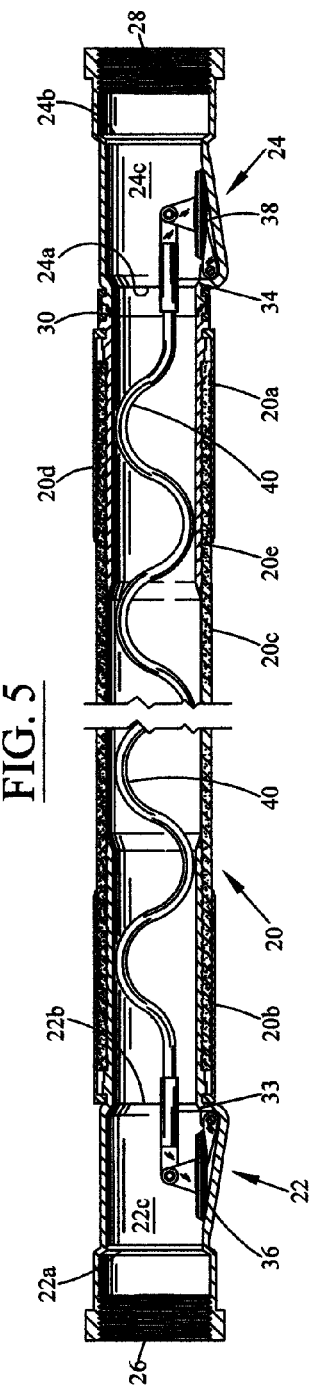
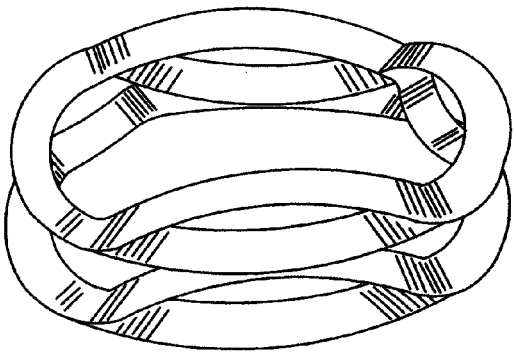
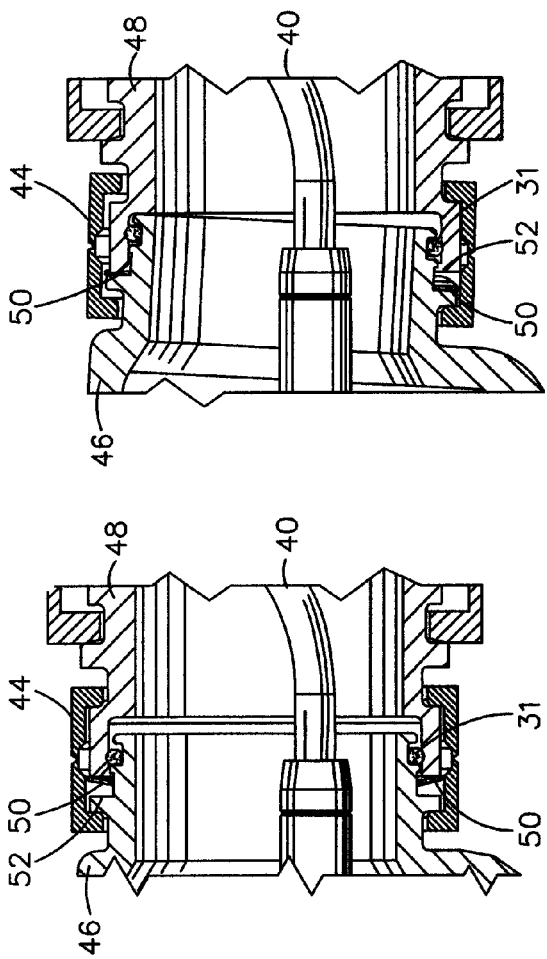

HIGH-PRESSURE FLUID CONDUIT

FIELD OF THE INVENTION

The present invention relates, in general, to high-pressure fluid delivery and, in particular, to a high-pressure fluid conduit having a safety feature that provides protection against errors by a workman conducting the fluid delivery operation or a failure of the conduit during the fluid delivery operation.

BACKGROUND

When filling containers (e.g., cylinders, tank trucks, rail cars, and stationary tanks) with compressed or non-compressed fluids, both gasses and liquids, or operating equipment that relies on pressurized fluid flow, the fluid is transferred from one container (e.g., a tank truck) to another container (e.g., a stationary tank). Although the fluid can be transferred from one container to another via solid piping, it is common practice in many situations to use a flexible conduit or hose that connects the two containers and through which the fluid is transferred. A flexible hose allows ease of connection/disconnection between the containers, as well as a limited range of motion between the source of the fluid and the destination of the fluid.

For example, compressed or non-compressed gasses, such as oxygen, nitrogen, and carbon dioxide, and liquids, such as chemicals, petroleum and acids, are transported, stored, and used in individual containers of varying size and capacity. In order to fill these containers with the desired product, each container is connected, either singly or in groups, to a fluid filler/seller. In order to connect each container to the filling connection, a flexible hose is used to allow for quick connection/disconnection of the containers to and from the filling connection. A filling station manifold is one example of a filling connection. In addition, operating equipment that runs or uses compressed fluids, such as a forklift or a hydraulic system, also benefits from the ease of use of flexible hoses.

There are various safety risks associated with transferring fluids from one container to another. Service personnel conducting fluid delivery operations might make human errors, such as driving a tank truck away after filling a container without disconnecting the hose from the tank truck and/or the filled container.

Hoses can fail even though they are generally made from durable, yet flexible, materials/constructions, such as treated and reinforced rubber, neoprene, nylon, stainless steel, and others. Hose failures, such as leaks, ruptures, splits, and cuts, can result, for example, from material deterioration of the hose or accidentally damaging the hose by operation of other equipment in the vicinity.

When a hose fails, regardless of the cause of the failure, substantial damage can result in a number of ways. First, if a hose is completely severed or split, both ends of the hose can whip around wildly under the forces of the compressed fluid that is exerted from the delivery end and the receiving end. In addition, if a container is not secured, the pressure of the fluid leaving the container can cause the container to move very rapidly in the opposite direction of the escaping fluid. Both of these situations can result in substantial risk of personal injury, as well as property damage. Furthermore, a hose failure will cause leaks from both the delivery and receiving ends, leading to a costly waste of the fluid, as well as the discharge of a hazardous fluid, that has the potential of filling the environment with hazardous fumes.

SUMMARY

A high-pressure fluid conduit adapted for connection between a high-pressure fluid source and a high-pressure fluid container, constructed in accordance with the present invention, includes a hose unit having a first end and a second end, a first housing adapted for connection to a high-pressure fluid source, and a second housing adapted for connection to a high-pressure fluid container. The first housing, adapted for connection to the high-pressure fluid source, has a first fluid opening through which high-pressure fluid from the high-pressure fluid source enters the first housing, a second fluid opening through which high-pressure fluid from the high-pressure fluid source leaves the first housing and enters the hose unit, and a cavity between the first fluid opening in the first housing and the second fluid opening in the first housing. The second housing, adapted for connection to the high-pressure fluid container, has a first fluid opening through which high-pressure fluid from the high-pressure fluid source leaves the hose unit and enters the second housing and high-pressure fluid from the high-pressure container tends to leave the second housing and enter the hose unit during a failure of the hose unit. The second housing also has a second fluid opening through which high-pressure fluid from the high-pressure fluid source leaves the second housing and enters the high-pressure fluid container and high-pressure fluid from the high-pressure fluid container tends to enter the hose unit during a failure of the hose unit. The second housing also has a cavity between the first fluid opening in the second housing and the second fluid opening in the second housing. A high-pressure fluid conduit adapted for connection between a high-pressure fluid source and a high-pressure fluid container, constructed in accordance with the present invention, also has an annular ring that couples at least one of the first housing to the first end of the hose unit and the second housing to the second end of the hose unit. The annular ring has a weakened section extending around the annular ring that fractures when a predetermined force is applied to the annular ring that causes first and second parts of the annular ring, on opposite sides of the weakened section, to separate. A high-pressure fluid conduit adapted for connection between a high-pressure fluid source and a high-pressure fluid container, constructed in accordance with the present invention, further includes a first valve seat at the second fluid opening in the first housing and a second valve seat at the first fluid opening in the second housing. A high-pressure fluid conduit adapted for connection between a high-pressure fluid source and a high-pressure fluid container, constructed in accordance with the present invention, also includes a first valve body pivotally mounted in the cavity of the first housing and movable between a first position to permit the flow of the high-pressure fluid from the high-pressure fluid source through the first housing and a second position against the first valve seat in the first housing to prevent high-pressure fluid leaving the first housing. A high-pressure fluid conduit adapted for connection between a high-pressure fluid source and a high-pressure fluid container, constructed in accordance with the present invention, also includes a second valve body pivotally mounted in the cavity of the second housing and movable between a first position to permit the flow of the high-pressure fluid from the high-pressure fluid source through the second housing and a second position against the second valve seat in the second housing to prevent fluid high-pressure fluid from the high-pressure fluid container leaving the second housing. A high-pressure fluid conduit adapted for connection between a high-pressure fluid source and a high-pressure fluid container, constructed in accordance with the present invention, further includes valve control means for retaining the first valve body in its first position and the second valve body in its first position and selectively moving the first valve body to its second position and the second valve body to its second position in response to fracture of the annular ring and separation of the first and second parts of the annular ring on opposite sides of the weakened section of the annular ring.

BRIEF DESCRIPTION OF THE DRAWINGS

FIG. 1 is a sectional view of a first embodiment of a high-pressure fluid conduit, constructed in accordance with the present invention, shown in the open or normal mode of operation.

FIG. 3 is a sectional view, on an enlarged scale, of one end of the FIG. 1 high-pressure fluid conduit shown in the open or normal mode of operation.

FIG. 5 is a sectional view of a second embodiment of a high-pressure fluid conduit, constructed in accordance with the present invention, shown in the open or normal mode of operation.

FIGS. 10a and 10b are sectional views that illustrate a second break-away section of a high-pressure fluid conduit constructed in accordance with the present invention.

FIG. 11 is a perspective view of a helical wave spring that can serve as the shock absorbing component in the FIGS. 10a and 10b break-away section of a high-pressure fluid conduit constructed in accordance with the present invention.

DETAILED DESCRIPTION OF THE INVENTION

Figure 2:
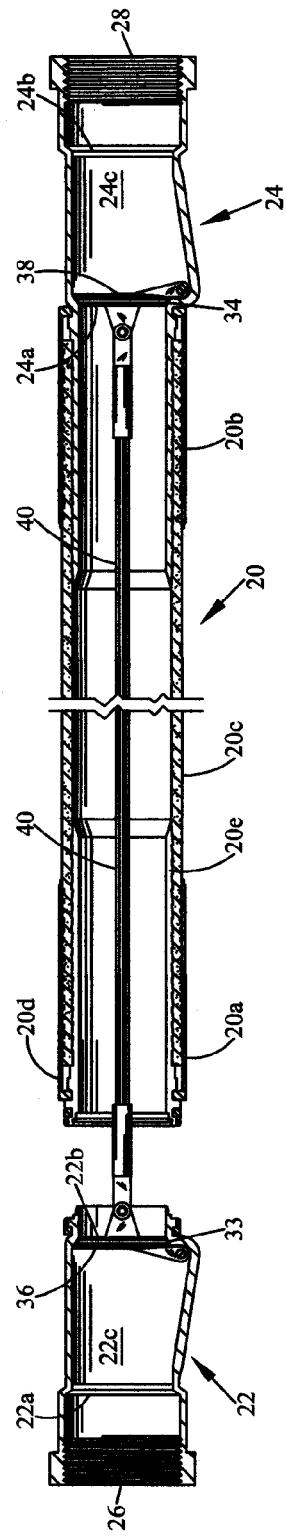
FIG. 2 is a sectional view of the FIG. 1 high-pressure fluid conduit shown in the closed or safety-activated mode of operation.

Referring to FIGS. 1 through 9, a high-pressure fluid conduit, constructed in accordance with the present invention, includes a hose unit 20 having a first end 20a and a second end 20b, a first housing 22, and a second housing 24. First housing 22 is adapted for connection to a high-pressure fluid source, such as a tank truck, and second housing 24 is adapted for connection to a high-pressure fluid container, such as a storage tank. The high-pressure fluid source is represented by a threaded member 26 that can be an outlet connection of the high-pressure fluid source for delivery of fluid from the high-pressure fluid source. The high-pressure fluid container is represented by a threaded member 28 that can be an inlet connection of the high-pressure fluid container for delivery of fluid to the high-pressure fluid container.

First housing 22 has a first fluid opening 22a through which high-pressure fluid from the high-pressure fluid source enters the first housing, a second fluid opening 22b through which high-pressure fluid from the high-pressure fluid source leaves the first housing and enters hose unit 20, and a cavity 22c between first fluid opening 22a in the first housing and second fluid opening 22b in the first housing.

Second housing 24 has a first fluid opening 24a through which high-pressure fluid from the high-pressure fluid source leaves hose unit 20 and enters the second housing during normal delivery of the fluid to the high-pressure fluid container or high-pressure fluid from the high-pressure container tends to leave the second housing and enter the hose unit during a failure of the hose unit. Second housing 24 also has a second fluid opening 24b through which high-pressure fluid from the high-pressure fluid source leaves the second housing and enters the high-pressure fluid container during normal delivery of the fluid to the high-pressure fluid container or high pressure fluid from the high-pressure fluid container tends to enter the second housing during a failure of the hose unit. Second housing 24 also has a cavity 24c between first fluid opening 24a in the second housing and second fluid opening 24b in the second housing.

A high-pressure fluid conduit, constructed in accordance with the present invention, also includes an annular ring 30 that (a) couples first housing 22 to first end 20a of hose unit 20, as illustrated in FIGS. 1 through 4, 6, and 8, or (b) couples second housing 24 to second end 20b of hose unit 20, as illustrated in FIG. 5, or (c) couples each end of hose unit 20 one of the housings. As will be explained below, annular ring 30 serves as a break-away component that fractures when a predetermined force is applied to the annular ring that results, for example, when the driver of a tank truck fails to disconnect the high-pressure fluid conduit from either the tank truck or the storage container before driving the tank truck away from the storage container. Upon fracture of annular ring 30, a safety feature is activated and the high-pressure fluid conduit switches from an open or normal mode of operation to a closed or safety-activated mode of operation.

Figure 6:
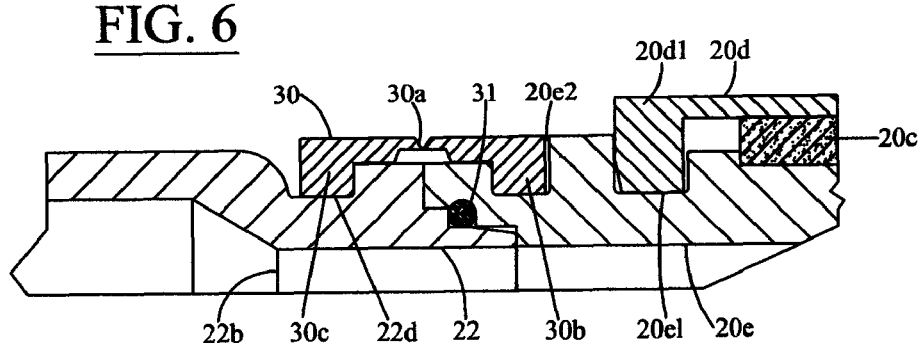
FIG. 6 is a sectional view, on an enlarged scale, that illustrates the break-away portion of a high-pressure fluid conduit, constructed in accordance with the present invention, while the high-pressure fluid conduit is in the FIG. 1 open or normal mode of operation.
Figure 8:
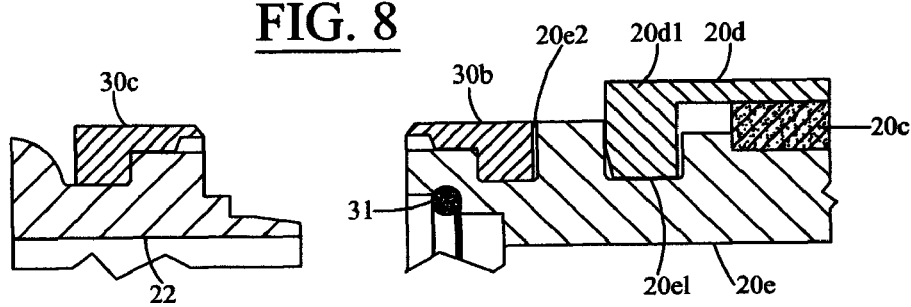
FIG. 8 is a sectional view, on an enlarged scale, that illustrates the break-away portion of a high-pressure fluid conduit, constructed in accordance with the present invention, after the high-pressure fluid conduit switches to the FIG. 2 closed or safety-activated mode of operation.

As shown most clearly in FIG. 6, annular ring 30 has a weakened section, in the form of a groove 30a, for the embodiment of the present invention that is illustrated and being described. Groove 30a extends circumferentially completely around annular ring 30, thereby resulting in a section of reduced thickness relative to the thickness of first and second parts 30b and 30c of the annular ring that are disposed on opposite sides of the weakened section, namely groove 30a. The size, shape, and extent of groove 30a calibrate annular ring 30 to fracture when a predetermined force is applied to the annular ring, whereupon first and second parts 30b and 30c of the annular ring separate as illustrated in FIG. 8. It should be noted that this force, when applied generally along the longitudinal axis of the high-pressure fluid conduit, will result in substantially uniform separation of first and second parts 30b and 30c of the annular ring along groove 30a, while a force applied at an angle to the longitudinal axis of the high-pressure fluid conduit will result in progressive separation of first and second parts 30b and 30c of the annular ring along groove 30a.

Hose unit 20 includes a fluid conducting hose 20c, first connecting means at a first end 20a of the hose unit for connecting a first end of the fluid conducting hose to first part 30b of annular ring 30 and second connecting means at second end 20b of hose unit 20 for connecting a second end of the fluid conducting hose to second housing 24. For the embodiment of the present invention that is illustrated and being described, fluid conducting hose 20c is secured at end 20a of hose unit 20 between an outer sleeve 20d and an inner sleeve 20e by suitable means, such as teeth on the contact surfaces of the sleeves that penetrate the surface of the fluid conducting hose, as illustrated. Hose unit 20 is arranged in a similar manner at second end 20b of the hose unit. It will be apparent, to those skilled in the art, that fluid conducting hose 20c can be connected to part 30b of annular ring 30 and to the second connecting means at second end 20b of hose unit 20 by other means, such as by welding or adhesives, depending, for example, on the materials chosen for the components that are being connected.

FIGS. 6 and 8 show most clearly how the first end of fluid conducting hose 20c at the first end 20a of hose unit 20 is connected to first part 30b of annular ring 30. Outer sleeve 20d of hose unit 20 has a shoulder 20d1 that is fitted into a notch 20e1 in inner sleeve 20e. Inner sleeve 20e has a second notch 20e2 into which first part 30b of annular ring 30 is fitted.

FIGS. 6 and 8 also shows most clearly how first housing 22 is connected at second opening 22b of the first housing to second part 30c of annular ring 30. Housing 22 has a notch 22d into which second part 30c of annular ring 30 is fitted.

A sealing ring 31 seals the joint at which annular ring 30 couples hose unit 20 to first housing 22.

When a force is applied to annular ring 30, such as when a tank truck, represented by reference numeral 26, pulls away without disconnecting from first housing 22, second part 30c of annular ring 30 is drawn in the direction of the applied force, while first part 30b of the annular ring is restrained from moving in the same direction because of its engagement in notch 20e2 in hose unit 20. When the applied force exceeds the predetermined level for which annular ring 30 has been calibrated, the annular ring will fracture along groove 30a. The fracture of annular ring 30 activates the safety feature of the present invention and the high-pressure fluid conduit switches from the open or normal mode of operation to the closed or safety-activated mode of operation, as will be described below.

FIG. 5 is a sectional view of a high-pressure fluid conduit, constructed in accordance with the present invention, with the break-away annular ring 30 located at the second end of hose unit 20 that is coupled to second housing 24 and in proximity to the high-pressure fluid container. The construction, functioning, and operation of this second embodiment of the present invention is, in all other respects, identical to the first embodiment that has been described above. As noted above, a high-pressure fluid conduit, constructed in accordance with the present invention, can be arranged with a break-away annular ring at both ends of hose unit 20 where the hose unit is coupled to the high-pressure fluid source and the high-pressure fluid container. In certain applications, such an arrangement for activating the safety feature of the present invention might be mandatory or highly desirable.

FIGS. 10a and 10b are sectional views that illustrate a second embodiment of the present invention that protects against a premature fracture of an annular ring 44, as might occur when an end of the high-pressure fluid conduit having an annular ring is dropped accidentally. FIG. 10a illustrates the break-away portion of the high-pressure fluid conduit while the high-pressure fluid conduit is in the FIG. 1 open or normal mode of operation and FIG. 10b illustrates the break-away portion of the high-pressure fluid conduit after a shock or force has been applied that might otherwise cause premature fracture of annular ring 44.

As shown in FIG. 10a, shock absorbing means, in the form of a compressible elastic washer 50 for the embodiment of the present invention illustrated and being described, are positioned in the space 52 that is formed radially inward of the weakened section of annular ring 44 between the weakened section of the annular ring and the confronting surfaces of housing 46 and hose unit 48. Other components, such as a mechanical helical wave spring that is illustrated in FIG. 11, can serve as the shock absorbing means.

When an end of the high-pressure fluid conduit that has an annular ring is exposed to a force or shock, as might occur when that end of the high-pressure fluid conduit is accidentally dropped, that portion of washer 50, diametrically opposite from the point at which the force or shock is applied, is compressed between housing 46 and hose unit 48, thereby absorbing the energy of the force or shock. Washer 50, in effect, isolates annular ring 44 from the force or shock by taking up the force or shock. As a result, washer 50 prevents premature fracture of annular ring 44. This protection against premature fracture of annular ring 44 can be incorporated at either end of the high-pressure fluid conduit or at both ends of the high-pressure fluid conduit.

Figure 4:
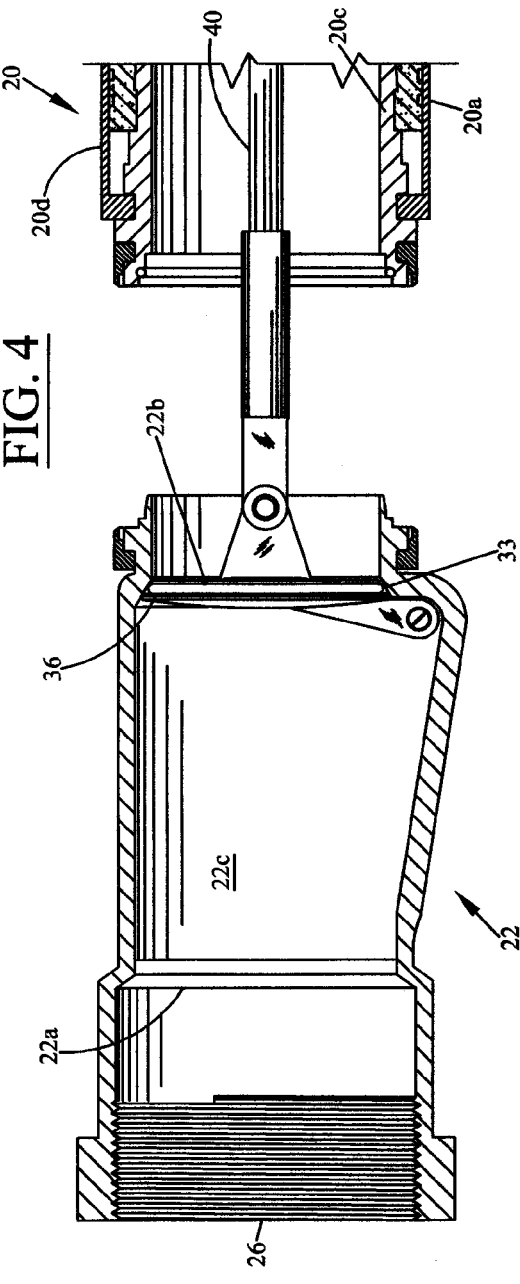
FIG. 4 is a sectional view, on an enlarged scale, of one end of the FIG. 2 high-pressure fluid conduit shown in the closed or safety-activated mode of operation.

A high-pressure fluid conduit, constructed in accordance with the present invention, also includes a first valve seat 33 at second fluid opening 22b in first housing 22, a second valve seat 34 at first fluid opening 24a in second housing 24, a first valve body 36, and a second valve body 38. First valve body 36 is pivotally mounted in cavity 22c of first housing 22 and is movable between a first position to permit the flow of the high-pressure fluid from the high-pressure fluid source through the first housing, as illustrated in FIGS. 1 and 3, and a second position against first valve seat 33 in the first housing to prevent high-pressure fluid leaving the first housing as illustrated in FIGS. 2 and 4. Second valve body 38 is pivotally mounted in cavity 24c of second housing 24 and is movable between a first position to permit the flow of the high-pressure fluid from the high-pressure fluid source through the second housing, as illustrated in FIG. 1, and a second position against second valve seat 34 in the second housing to prevent fluid high-pressure fluid from the high-pressure fluid container leaving the second housing, as illustrated in FIG. 2.

A high-pressure fluid conduit, constructed in accordance with the present invention, also includes valve control means for retaining first valve body 36 in its first position and second valve body 38 in its first position and selectively moving the first valve body to its second position against valve seat 33 and the second valve body to its second position against valve seat 34. The valve control means move first valve body 36 into engagement with first valve seat 33 and second valve body 38 into engagement with second valve seat 34 in response to a fracture of annular ring 30 and separation of first and second parts 30b and 30c of the annular ring.

Figure 7:
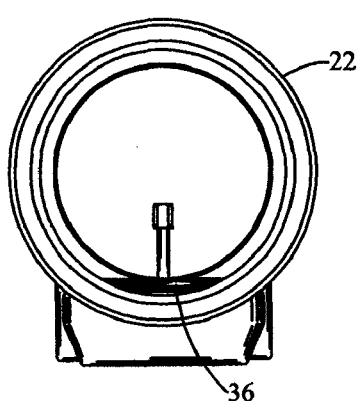
FIG. 7 is an end view of the FIG. 1 high pressure fluid conduit while the high-pressure fluid conduit is in the open or normal mode of operation.

More specifically, for the embodiment of the present invention that is illustrated and being described, the valve control means include a serpentine cable 40 connected between first valve body 36 and second valve body 38. Cable 40 is made from a flexible, yet relatively stiff, material capable of retaining valve bodies 36 and 38 in their respective first positions, as shown in FIGS. 1, 3, and 7, so that high-pressure fluid from the high-pressure fluid source is permitted to flow to the high-pressure fluid container during open or normal fluid delivery.

Figure 9:
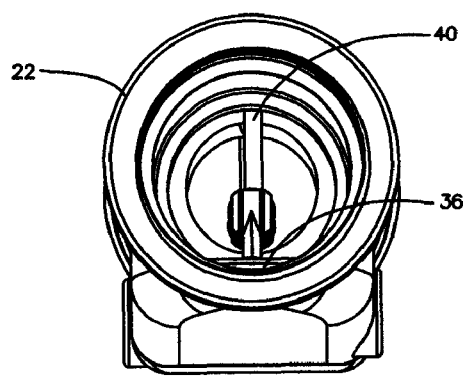
FIG. 9 is an end view of the FIG. 2 high pressure fluid conduit after the high-pressure fluid conduit switches to the FIG. 2 closed or safety-activated mode of operation.

Fracture of annular ring 30 results in increased separation of first housing 22 from second housing 24, which, in turn, causes cable 40 to straighten and ultimately to cause valve bodies 36 and 38 to pivot to their respective second positions, namely, against valve seats 33 and 34, respectively, as shown in FIGS. 2, 4, and 9. With valve bodies 36 and 38 positioned against valve seats 33 and 34, respectively, opening 22b of housing 22 and opening 24a of housing 24 are sealed to prevent high-pressure fluid flow from the high-pressure fluid source and high-pressure fluid flow from the high-pressure fluid container during a closed or safety-activated mode of operation. High-pressure fluid, entering cavity 22c of housing 22 from the high-pressure fluid source, maintains the seal between valve body 36 and valve seat 33 during the closed or safety-activated mode of operation. High-pressure fluid, entering cavity 24c of housing 24 from the high-pressure fluid container, maintains the seal between valve body 38 and valve seat 34 during the closed or safety-activated mode of operation.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A high-pressure fluid conduit adapted for connection between a high-pressure fluid source and a high-pressure fluid container, said high-pressure fluid conduit comprising:
   a hose unit having a first end and a second end;
   a first housing adapted for connection to a high-pressure fluid source and having:
   (a) a first fluid opening through which high-pressure fluid from the high-pressure fluid source enters said first housing,
   (b) a second fluid opening through which high-pressure fluid from the high pressure fluid source leaves said first housing and enters said hose unit, and
   (c) a cavity between said first fluid opening in said first housing and said second fluid opening in said first housing;
   a second housing adapted for connection to a high-pressure fluid container and having:
   (a) a first fluid opening through which:
      (1) high-pressure fluid from the high-pressure fluid source leaves said hose unit and enters said second housing, and
      (2) high-pressure fluid from the high-pressure fluid container tends to leave said second housing and enter said hose unit during a failure of said hose unit,
   (b) a second fluid opening through which:
      (1) high-pressure fluid from the high-pressure fluid source leaves said second housing and enters the high-pressure fluid container, and
      (2) high-pressure fluid from the high-pressure fluid container tends to enter said hose unit during a failure of said hose unit, and
   (c) a cavity between said first fluid opening in said second housing and said second fluid opening in said second housing;
   an annular ring:
   (a) coupling at least one of:
      (1) said first housing to said first end of said hose unit, and
      (2) said second housing to said second end of said hose unit, and
   (b) having a weakened section extending around said annular ring that fractures when a predetermined force is applied to said annular ring that causes first and second parts of said annular ring on opposite sides of said weakened section to separate;
   a first valve seat at said second fluid opening in said first housing;
   a second valve seat at said first fluid opening in said second housing;
   a first valve body pivotally mounted in said cavity of said first housing and movable between:
   (a) a first position to permit the flow of the high-pressure fluid from the high-pressure fluid source through said first housing, and
   (b) a second position against said first valve seat in said first housing to prevent high-pressure fluid leaving said first housing;
   a second valve body pivotally mounted in said cavity of said second housing and movable between:
   (a) a first position to permit the flow of the high-pressure fluid from the high-pressure fluid source through said second housing, and
   (b) a second position against said second valve seat in said second housing to prevent the flow of high-pressure fluid from the high-pressure fluid container leaving said second housing; and
   valve control means for:
   (a) retaining said first valve body in its first position and said second valve body in its first position, and
   (b) selectively moving said first valve body to its second position and said second valve body to its second position in response to fracture of said annular ring and separation of said first and second parts of said annular ring on opposite sides of said weakened section of said annular ring.

2. A high-pressure fluid conduit according to claim 1 wherein said valve control means include a serpentine cable connected between said first valve body and said second valve body.

3. A high-pressure fluid conduit according to claim 2 wherein said annular ring is a coupling between said first housing and said first end of said hose unit.

4. A high-pressure fluid conduit according to claim 3 wherein said weakened section of said annular ring has a reduced thickness, relative to the thickness of said first and second parts of said annular ring, that extends completely around said annular ring.

5. A high-pressure fluid conduit according to claim 4 wherein said weakened section of said annular ring is continuous groove that extends circumferentially of said annular ring.

6. A high-pressure fluid conduit according to claim 5 further including a shock absorber positioned radially inward of said weakened section of said annular ring and between said first housing and said first end of said hose unit.

7. A high-pressure fluid conduit according to claim 6 wherein said shock absorber is a compressible washer.

8. A high-pressure fluid conduit according to claim 6 wherein said shock absorber is a mechanical wave spring.

9. A high-pressure fluid conduit according to claim 5 wherein:
   (a) said hose unit includes:
      (1) a fluid conducting hose,
      (2) first connecting means at said first end of said hose unit for connecting a first end of said fluid conducting hose to said first part of said annular ring, and
      (3) second connecting means at said second end of said hose unit for connecting a second end of said fluid conducting hose to said second housing, and
   (b) said first housing includes third connecting means at said second opening of said first housing for connecting said first housing to said second part of said annular ring.

10. A high-pressure fluid conduit according to claim 9 further including a shock absorber positioned radially inward of said weakened section of said annular ring and between said first housing and said first end of said hose unit.

11. A high-pressure fluid conduit according to claim 9 wherein said shock absorber is a compressible washer.

12. A high-pressure fluid conduit according to claim 10 wherein said shock absorber is a mechanical wave spring.

13. A high-pressure fluid conduit according to claim 2 wherein said annular ring is a coupling between said second housing and said second end of said hose unit.

14. A high-pressure fluid conduit according to claim 13 wherein said weakened section of said annular ring has a reduced thickness, relative to the thickness of said first and second parts of said annular ring, that extends completely around said annular ring.

15. A high-pressure fluid conduit according to claim 14 wherein said weakened section of said annular ring is a continuous groove that extends circumferentially of said annular ring.

16. A high-pressure fluid conduit according to claim 15 further including a shock absorber positioned radially inward of said weakened section of said annular ring and between said second housing and said second end of said hose unit.

17. A high-pressure fluid conduit according to claim 16 wherein said shock absorber is a compressible washer.

18. A high-pressure fluid conduit according to claim 16 wherein said shock absorber is a mechanical wave spring.

19. A high-pressure fluid conduit according to claim 15 wherein:
  (a) said hose unit includes:
    (1) a fluid conducting hose,
    (2) first connecting means at said second end of said hose unit for connecting a second end of said fluid conducting hose to said second part of said annular ring, and
    (3) second connecting means at said first end of said hose unit for connecting a first end of said fluid conducting hose to said first housing, and
  (b) said second housing includes third connecting means at said second opening of said second housing for connecting said second housing to said first part of said annular ring.

20. A high-pressure fluid conduit according to claim 19 further including a shock absorber positioned radially inward of said weakened section of said annular ring and between said second housing and said second end of said hose unit.

21. A high-pressure fluid conduit according to claim 20 wherein said shock absorber is a compressible washer.

22. A high-pressure fluid conduit according to claim 20 wherein said shock absorber is a mechanical wave spring.

23. A high-pressure fluid conduit adapted for connection between a high-pressure fluid source and a high-pressure fluid container, said high-pressure fluid conduit comprising:
  a hose unit having a first end and a second end;
  a first housing adapted for connection to a high-pressure fluid source and having:
    (a) a first fluid opening through which high-pressure fluid from the high-pressure fluid source enters said first housing,
    (b) a second fluid opening through which high-pressure fluid from the high pressure fluid source leaves said first housing and enters said hose unit, and
    (c) a cavity between said first fluid opening in said first housing and said second fluid opening in said first housing;
  a second housing adapted for connection to a high-pressure fluid container and having:
    (a) a first fluid opening through which:
      (1) high-pressure fluid from the high-pressure fluid source leaves said hose unit and enters said second housing, and
      (2) high-pressure fluid from the high-pressure fluid container tends to leave said second housing and enter said hose unit during a failure of said hose unit,
    (b) a second fluid opening through which:
      (1) high-pressure fluid from the high-pressure fluid source leaves said second housing and enters the high-pressure fluid container, and
      (2) high-pressure fluid from the high-pressure fluid container tends to enter said hose unit during a failure of said hose unit, and
    (c) a cavity between said first fluid opening in said second housing and said second fluid opening in said second housing;
  an annular ring:
    (a) coupling at least one of:
      (1) said first housing to said first end of said hose unit, and
      (2) said second housing to said second end of said hose unit, and
    (b) having a weakened section extending around said annular ring that fractures when a predetermined force is applied to said annular ring that causes first and second parts of said annular ring on opposite sides of said weakened section to separate;
  a first valve seat at said second fluid opening in said first housing;
  a second valve seat at said first fluid opening in said second housing;
  a first valve body mounted in said cavity of said first housing and movable between:
    (a) a first position to permit the flow of the high-pressure fluid from the high-pressure fluid source through said first housing, and
    (b) a second position against said first valve seat in said first housing to prevent high-pressure fluid leaving said first housing;
  a second valve body mounted in said cavity of said second housing and movable between:
    (a) a first position to permit the flow of the high-pressure fluid from the high-pressure fluid source through said second housing, and
    (b) a second position against said second valve seat in said second housing to prevent the flow of high-pressure fluid from the high-pressure fluid container leaving said second housing; and
  valve control means for:
    (a) retaining said first valve body in its first position and said second valve body in its first position, and
    (b) selectively moving said first valve body to its second position and said second valve body to its second position in response to fracture of said annular ring and separation of said first and second parts of said annular ring on opposite sides of said weakened section of said annular ring.

24. A high-pressure fluid conduit according to claim 23 wherein said annular ring is a coupling between said first housing and said first end of said hose unit.

25. A high-pressure fluid conduit according to claim 24 wherein said weakened section of said annular ring has a reduced thickness, relative to the thickness of said first and second parts of said annular ring, that extends completely around said annular ring.

26. A high-pressure fluid conduit according to claim 25 wherein said weakened section of said annular ring is continuous groove that extends circumferentially of said annular ring.

27. A high-pressure fluid conduit according to claim 26 wherein:
(a) said hose unit includes:
(1) a fluid conducting hose,
(2) first connecting means at said first end of said hose unit for connecting a first end of said fluid conducting hose to said first part of said annular ring, and
(3) second connecting means at said second end of said hose unit for connecting a second end of said fluid conducting hose to said second housing, and
(b) said first housing includes third connecting means at said second opening of said first housing for connecting said first housing to said second part of said annular ring.

28. A high-pressure fluid conduit according to claim 24 further including a shock absorber positioned radially inward of said weakened section of said annular ring and between said first housing and said first end of said hose unit.

29. A high-pressure fluid conduit according to claim 28 wherein said shock absorber is a compressible washer.

30. A high-pressure fluid conduit according to claim 28 wherein said shock absorber is a mechanical wave spring.

* * * * *

UNITED STATES PATENT AND TRADEMARK OFFICE
CERTIFICATE OF CORRECTION

| | | |
|---|---|---|
| PATENT NO. | : 8,336,570 B2 | Page 1 of 1 |
| APPLICATION NO. | : 13/047842 | |
| DATED | : December 25, 2012 | |
| INVENTOR(S) | : Robert Cardona | |

It is certified that error appears in the above-identified patent and that said Letters Patent is hereby corrected as shown below:

In the Claims

In column 9, line 1, claim "9" should change to claim --10--.

Signed and Sealed this
Twenty-first Day of May, 2013

Teresa Stanek Rea
*Acting Director of the United States Patent and Trademark Office*